United States Patent [19]

Ackerman

[11] 4,389,791
[45] Jun. 28, 1983

[54] RANGE-FINDING TELESCOPIC SIGHT

[75] Inventor: William R. Ackerman, El Paso, Tex.

[73] Assignee: W. R. Weaver Co., El Paso, Tex.

[21] Appl. No.: 260,246

[22] Filed: May 4, 1981

[51] Int. Cl.³ .......................... F41G 1/38; G01C 9/02
[52] U.S. Cl. ........................................ 33/246; 356/21
[58] Field of Search ................. 33/233, 245, 246, 298;
356/3, 10, 21, 252; 350/10, 11

[56] References Cited

U.S. PATENT DOCUMENTS

| | | | |
|---|---|---|---|
| 3,123,915 | 3/1964 | Wilkinson | 33/246 |
| 3,340,614 | 9/1967 | Leatherwood | 33/246 |
| 3,386,330 | 6/1968 | Burris et al. | 356/21 |
| 3,431,652 | 3/1969 | Leatherwood | 33/246 |
| 3,777,404 | 12/1973 | Oreck | 33/245 |

FOREIGN PATENT DOCUMENTS 597017  5/1934  Fed. Rep. of Germany ...... 350/562

*Primary Examiner*—Harry N. Haroian
*Attorney, Agent, or Firm*—Ralph D'Alessandro; Donald F. Clements; Thomas P. O'Day

[57] ABSTRACT

A telescopic sight provides means for determining the range of a target of known size and for compensating for predetermined bullet drop over the target range. Reticles are fixed in both the front and rear focal planes of the sight, and first screw means, calibrated to indicate range, are provided for controllably rotating the erector tube to displace the image of the front reticle, formed in the rear focal plane, so as to bracket the target between the rear reticle cross-hairs and the image of the front reticle. Second screw means, also operable to rotate the erector tube, displace the target image so as to compensate for bullet drop.

8 Claims, 4 Drawing Figures

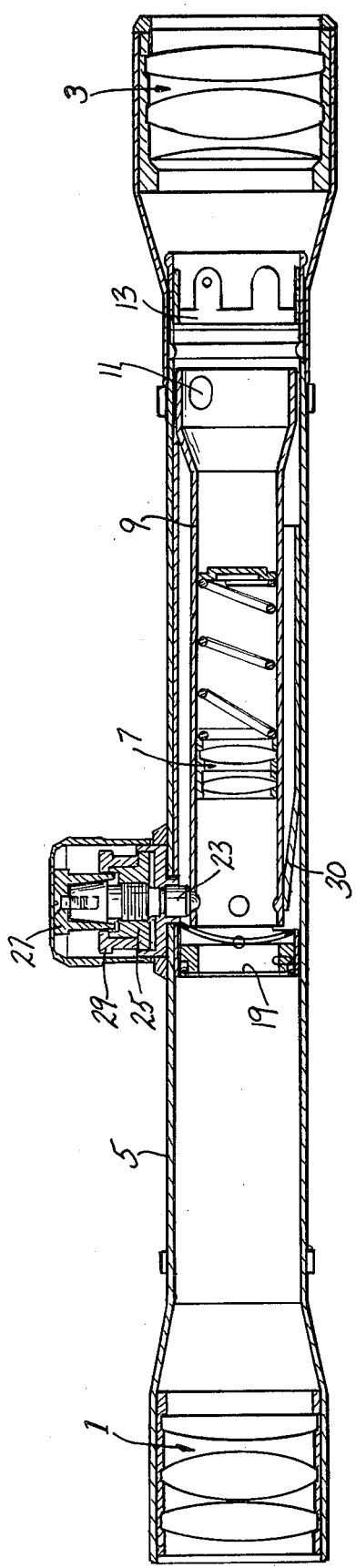
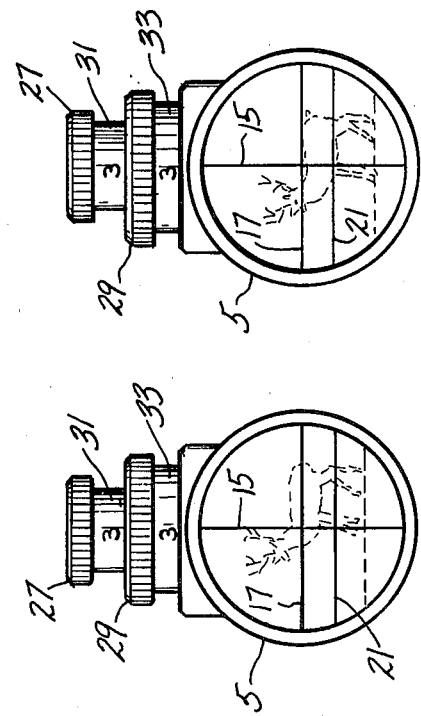
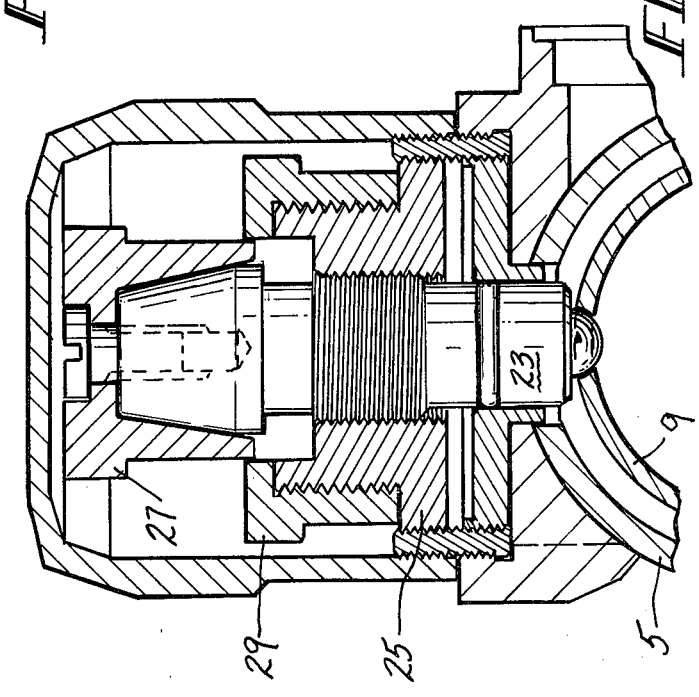
FIG-1
FIG-2
FIG-3
FIG-4

RANGE-FINDING TELESCOPIC SIGHT

BACKGROUND AND SUMMARY OF THE INVENTION

The present invention relates to telescopic sights for firearms and, more particularly, to range-finding and range-compensating features for such a sight.

Present range-finding telescopic sights depend, in general, on a stadia measurement system in which the power adjustment control is manipulated to adjust the size of the target image so as to fill the space between pre-set reticle marks. The range is then indicated by the setting of the power adjustment control. Such systems, obviously, are of use only in variable power sights.

For use in fixed-power sights, it is known to provide both fixed and movable reticles; the movable reticle being manipulated so as to bracket the target therebetween. The range is then indicated by the setting of the reticle adjustment control. Such systems are generally complex and further suffer in that, in high power sights, the magnification of the movable reticle obstructs the view of the target area.

It is, therefore, a primary object of the present invention to provide a telescopic sight which indicates the range of a target of known size and, more particularly, to provide such range-finding capability in a sight of fixed or high power.

It is another object to provide a telescopic sight which compensates for predetermined bullet drop over the target range.

It is yet another object to provide a sight as aforesaid which is sturdy, accurate, and simple to use.

It is a further object to provide such a sight which may be readily adjusted for use with firearms and/or ammunition loads of differing characteristics and for targets of different sizes.

The foregoing objects are achieved by a telescopic sight having first and second reticles fixed, respectively, in the rear and front focal planes, and means for controllably displacing the image of the second reticle, formed in the rear focal plane, so as to bracket the target between the first reticle and the image of the second reticle. The image displacing means is calibrated so as to indicate the range of the bracketed target. More specifically, the image displacing means comprises first screw means threadedly mounted in the sight body tube and operable to pivot the erector tube. There is also provided second screw means operable to rotate the erector tube to compensate for predetermined bullet drop over the target range.

BRIEF DESCRIPTION OF THE DRAWING

The above and other objects and advantages of the present invention may be more clearly understood through reference to the following description of the preferred embodiment, the appended claims and the drawing, wherein:

FIG. 1 is a longitudinal cross-sectional view of a telescopic sight in accord with the present invention;

FIG. 2 is a transverse cross-sectional view, taken substantially along line 2—2 of FIG. 1;

FIG. 3 is a view, through the sight of FIGS. 1 and 2, showing a target bracketed; and FIG. 4 is a view, similar to FIG. 3, showing the sight centered on a chosen point on the target.

DETAILED DESCRIPTION OF THE PREFERRED EMBODIMENT

Turning now to the drawing, there is shown a telescopic sight comprising an objective lens set 1 and an ocular lens set 3 fixed, respectively, at the front and rear ends of a body tube 5. An erector lens set 7 is fixed in an erector tube 9 which is disposed in body tube 5 between objective and ocular lens sets 1 and 3. A protrusion (not shown), on the inner surface of body tube 5, pivotably engages a recess 11 in the rear end of erector tube 9.

A first reticle 13, including vertical and horizontal wires 15 and 17 respectively, is fixed in the rear focal plane of the sight and a second reticle 19, having only a horizontal wire 21, is adjustably fixed, as will be more fully explained hereinafter, in the front focal plane.

Position of erector tube 9 is controlled by a range screw member 23 disposed perpendicular to the axis of body tube 5 and by a compensating screw member 25 threadedly telescoped thereover and threadedly engaging body tube 5. For reasons which will later become apparent, the thread connection between range and compensating screw members 23 and 25 affords less surface contact than the thread connection between compensating screw member 25 and body tube 5, whereby compensating screw member 25 is unaffected by rotation of range screw member 23, while rotation of compensating screw member 25 causes a corresponding rotation of range screw member 23. Range and compensating control rings 27 and 29 are disposed on the outer or distal ends of the respective screw members 23 and 25. A spring 30 biases erector tube 9 against the inner end of range screw member 23.

Range control ring 27 bears calibrated range scale 31 indicating the target range in 100 yard increments. Likewise, compensating control ring 29 bears compensation scale 33, calibrated in 100 yard increments for the particular firearm and ammunition load, permitting adjustments to compensate for predetermined bullet drop over the indicated range.

The mode of operation of the sight will now be explained with reference to a deer as the intended target, it being understood, however, that the present invention is equally adaptable to use in respect of any target of a known size.

Apart from its range-finding and range-compensating features, the telescopic sight of the present invention functions in the manner of conventional telescopic sights, with both elevation and windage adjustment used to "zero" the sight. It has been found most effective to "zero" the sight at a range of 200 yards.

After zeroing, second article 19 is adjusted such that the separation of horizontal wire 21 and horizontal wire 17 subtends an angle of exactly 9 minutes (9 MOA), with wire 21 being below wire 17. This angle corresponds to the known average "back-to-brisket" size of a deer (18 inches) at 200 yards.

At this point, no further adjustment to second reticle 19 will be required. Range and compensating control rings 27 and 29 are now adjusted to align the "zeroing" range (200 yards in this example) marked thereon with a reference mark on the exterior of body tube 5.

Range-finding is accomplished by bracketing the target between wires 21 and 17 through rotation of range control ring 27. This causes a corresponding rotation of range screw member 23 and, in turn, a pivoting of erector tube 9, thereby shifting the image of wire 21. When the wires 21 and 17 suitably bracket the target, as shown in FIG. 3, the range thereto may be read from range scale 31, the calibration of which, in the present example, is based upon the following angle subtension sacle:

| RANGE (yds.) | ANGLE (MOA) |
|---|---|
| 100 | 18 |
| 200 | 9 |
| 300 | 6 |
| 400 | 4.5 |
| 500 | 3.6 |
| 600 | 3.0 |

Once the range to the target has been determined, compensating control ring 29 is rotated so as to set the range on compensation scale 33, pivoting erector tube 9. The firearm is now moved so as to place the intersection of wires 15 and 17 on the chosen point of the target, as seen in FIG. 4, and aiming is complete. As previously noted, scale 33 is calibrated for the particular firearm and ammunition load employed. Versatility of the sight is greatly enhanced by mounting scale 33 so as to be easily removable, whereby the same may be readily replaced with other, precalibrated, scales permitting use of the sight with other firearms or ammunition loads.

It is also to be noted that, over relatively short ranges, bullet drop is comparatively slight, whereby the erector tube rotation effected during range determination is sufficient to compensate for such drop, and no further compensation is required. Thus, at these short ranges, the sight is automatically compensating. Likewise, at long ranges, where bullet drop compensation is required, range screw member 23 is "carried along" during rotation of compensating screw member 25, thereby further rotating erector tube 9 and reducing the required rotation of compensating control ring 29.

While the present invention has been described with reference to a particular embodiment, it should be readily apparent that changes may be made to the various components, and the arrangement thereof, without departing from the contemplation and spirit of the invention, which is intended to be limited in scope only by the appended claims.

I claim:

1. In a telescopic sight of the type comprising an objective lens set, an ocular lens set, an erector lens set disposed between said objective and ocular lens sets, a first reticle, fixed in the rear focal plane of the sight; the improvement comprising in combination:
   (a) a second reticle fixed in the front focal plane of the sight;
   (b) means for controllably displacing the image of said second reticle formed in said rear focal plane operable to bracket a target of known size between said first reticle and said image of said second reticle, said displacing means further including means for indicating the range to said target; and
   (c) means integral with said displacing means for shifting the target image in said rear focal plane subsequent to determining the range to compensate for predetermined bullet drop over the range indicated by said displacing means.

2. The sight of claim 1, wherein said objective and ocular lens sets are fixed in a body tube and said erector lens set is fixed in an erector tube pivotably mounted in said body tube, said displacing means being operable to pivot said erector tube about its mount.

3. The sight of claim 2, wherein said displacing means comprises screw means threadedly mounted in said body tube and spring means, disposed in said body tube, biasing said erector tube into contact with said screw means.

4. The sight of claim 3, wherein said screw means comprises a first screw member disposed perpendicular to the axis of said body tube, and said compensating means comprises a second screw member threadedly telescoped over said first screw member and threadedly engaging said body tube, the thread connection between said first and second screw members affording less surface contact than the thread connection between said second screw member and said body tube, whereby said second screw member is unaffected by rotation of said first screw member, while rotation of said second screw member causes a corresponding rotation of said first screw member.

5. The sight of claim 4, further comprising a control ring disposed on an end of said second screw member and having markings proportional to the predetermined amounts of bullet drop, for a given firearm and round of ammunition.

6. The sight of claim 5, wherein said control ring is readily replaceable to allow use of the sight with differeing firearms and/or ammunition loads.

7. A method of aiming a firearm at a chosen point on a target of known size, at an undetermined range, comprising the steps of:
   a. providing, on said firearm, a telescopic sight including first and second reticles fixed, respectively, in the rear and front focal planes of said sight, and means for displacing the image of said second reticle in said rear focal plane;
   b. calibrating said adjustment means to indicate the range of a target of said known size when bracketed between said first reticle and the image of said second reticle in said rear focal plane;
   c. moving said image of said second reticle so as to bracket the target between said first reticle and said image of said second reticle;
   d. reading the range of said bracketed target from said adjustment means;
   e. adjusting said sight to compensate for known bullet drop at the target range; and
   f. centering said first reticle on said chosen point on said target.

8. The method of claim 7, further comprising the step of providing replaceable means, specially configured for the particular firearm and ammunition load employed, for adjusting the sight to compensate for bullet drop.

* * * * *